(12) United States Patent
Thoreson et al.

(10) Patent No.: US 8,714,592 B1
(45) Date of Patent: May 6, 2014

(54) SYSTEM FOR SECURING A VEHICLE DURING TRANSPORT AGAINST MOVEMENT UNDER FORCES FROM MULTIPLE DIRECTIONS

(71) Applicant: Hendrick Motorsports Performance Group, LLC, Charlotte, NC (US)

(72) Inventors: Mark Allen Thoreson, Concord, NC (US); Ryan Lee Hensley, Huntersville, NC (US)

(73) Assignee: Hendrick Motorsports Performance Group, LLC, Charlotte, NC (US)

( * ) Notice: Subject to any disclaimer, the term of this patent is extended or adjusted under 35 U.S.C. 154(b) by 0 days.

(21) Appl. No.: 14/025,515

(22) Filed: Sep. 12, 2013

(51) Int. Cl.
*B60R 9/06* (2006.01)

(52) U.S. Cl.
USPC .......................................................... 280/769

(58) Field of Classification Search
USPC ........................................ 280/769; 296/189.1
See application file for complete search history.

(56) References Cited

U.S. PATENT DOCUMENTS

| | | | |
|---|---|---|---|
| 2,064,415 A | 12/1936 | Colman | |
| 2,073,349 A | 3/1937 | Nampa | |
| 2,970,850 A | 2/1961 | Blunden | |
| 3,814,461 A | 6/1974 | Rhody | |
| 4,049,229 A | 9/1977 | Peisner | |
| 4,369,010 A | 1/1983 | Ichinose et al. | |
| 5,054,806 A | 10/1991 | Chester | |
| 6,503,035 B1 | 1/2003 | Perrott | |
| 6,702,347 B1 | 3/2004 | Hollinger et al. | |
| 6,896,281 B2 | 5/2005 | Lenzen, Jr. et al. | |
| 7,472,919 B2 | 1/2009 | Pratt et al. | |
| 7,775,546 B2 | 8/2010 | Asjad | |
| 7,857,559 B2 | 12/2010 | Lee | |
| 8,371,602 B1 | 2/2013 | Peschansky et al. | |
| 2007/0092365 A1* | 4/2007 | Filiatreault | 414/491 |
| 2011/0250033 A1 | 10/2011 | Parkinson | |
| 2013/0257094 A1* | 10/2013 | McCloud | 296/184.1 |

OTHER PUBLICATIONS

Ed Grabianowski, "How Crumple Zones Work", website: http://auto.howstuffworks.com, Jul. 23, 2013, pp. 1-2.
Wikipedia, "Crumple Zone", website: http://en.wikipedia.org, catagories: Automotive safety technologies, Jun. 12, 2013, pp. 1-6.
U.S. Department of Defense, "Interface Standard for Lifting and Tiedown Provisions", MIL-STD-209K, Feb. 22, 2005, pp. 1-37, Appendix A, Appendix B, Appendix C and Appendix D.
U.S. Department of Defense, "Interface Standard Requirements for Tiedown, Suspension and Extraction Provisions on Military Materiel for Airdrop", MIL-STD-814D, Feb. 3, 1997, pp. 1-19.

* cited by examiner

*Primary Examiner* — John Walters
*Assistant Examiner* — James Triggs
(74) *Attorney, Agent, or Firm* — K&L Gates LLP (57) ABSTRACT

A system for securing a vehicle during transport comprises in combination a vehicle having a frame with at least one deformation zone, multiple tie-downs affixed to the frame at spaced-apart locations, a supporting surface with multiple anchor points at spaced-apart locations, and multiple ties extending between each tie-down and a respective anchor point. Each front and rear side of the frame has at least two tie-downs, and each left and right side of the frame has at least one tie-down. At least two anchor points are located on the supporting surface outwardly from each side of the vehicle. Each tie extends between one tie-down and a respective anchor point at a corresponding side of the vehicle. The ties are selectively arranged in relation to one another to retain the vehicle substantially against movement on the supporting surface but without deforming the deformation zone of the vehicle frame.

23 Claims, 6 Drawing Sheets

SYSTEM FOR SECURING A VEHICLE DURING TRANSPORT AGAINST MOVEMENT UNDER FORCES FROM MULTIPLE DIRECTIONS

FIELD OF THE INVENTION

The present invention relates generally to systems for securing vehicles while being transported from one location to another, typically while being carried by another vehicle. More particularly, the present invention relates to such systems for securing vehicles for transport via aircraft, especially military vehicles being transported via military aircraft, including transport via airdrop platforms.

BACKGROUND OF THE INVENTION

Automotive vehicles are often transported from one location to another via truck, ship or aircraft, but regardless of the mode of transportation, a common requirement is that the vehicle must be carefully secured against movement during shipment. For that purpose, vehicles are typically equipped with securement locations, commonly referred to as "tie-downs", usually on a frame structure of the vehicle, to which restraint devices may be attached and in turn secured to a structural member of the transport vehicle, such as a floor surface.

As automotive safety technology has advanced in recent years, automotive engineers have learned that increased rigidity and strength of vehicle frame and body components does not necessarily promote or insure the safety of vehicle passengers and occupants, but to the contrary can be harmful to the extent that forces exerted on a vehicle in a crash or other accident can be transmitted unabated directly to occupants by a rigid vehicle structure. Accordingly, it has become commonplace for vehicle designs to include frame and body components designed to deform under forces generated in an accident, usually referred to as "crumple zones," intended to absorb such forces and thereby mitigate the forces imposed on vehicle occupants. However, such deformation or crumple zones present potential issues in transporting vehicles as tie-down systems can potentially impose deformation to the frame or body components if the tie-down forces are too great.

The transportation of military vehicles via military aircraft presents even greater concerns in avoiding potential frame damage to the vehicles via tie-down systems as military specifications, e.g., U.S. Department of Defense Specifications MIL-STD-209 and MIL-STD 814, call for tie-down systems to withstand substantial forces, e.g., acceleration, deceleration, and centrifugal forces, that may occur during flight. Military vehicles are typically manufactured with reinforced structural frames that do not include crumple or deformation zones, and therefore are less subject to potential damage under such high tie-down forces. Various vehicles could offer advantages if adapted for military use, but would almost certainly fail to meet the aforementioned tie-down standards.

Accordingly, a need exists for an improved system for tie-down of vehicles during transport from one location to another, by which greater securement tie-down forces could be applied without damaging frame crumple zones in vehicles. In turn, such an improved tie-down system could greatly expand the possibilities for military adaptation of vehicles not originally built for military purposes.

SUMMARY OF THE INVENTION

It is accordingly an object of the present invention to provide an improved system for tie-down of vehicles during transportation that mitigates risk of damage to vehicle frame components and potentially expands the possibilities for vehicles to be adapted to military uses.

Briefly summarized, the present invention provides a system for securing a vehicle during transport against movement under forces from multiple directions. Basically, the tie-down system of the present invention comprises in combination a vehicle having a frame with at least one deformation zone adapted to yield to absorb impact forces in the event of a crash of the vehicle, a plurality of tie-downs affixed to the frame at selected laterally spaced-apart locations about the frame, a supporting surface with a plurality of anchor points at laterally spaced-apart locations for supporting the vehicle during transport, and a plurality of elongate ties extending tautly between each tie-down and a respective anchor point.

According to the present invention, at least two tie-downs are provided at each of a front side and a rear side of the frame, and at least one tie-down is provided at each of a left side and a right side of the frame. The anchor points on the supporting surface are provided at selected laterally spaced-apart locations about the supporting surface outwardly from each side of the vehicle, including at least two anchor points forward of the front side of the vehicle, at least two anchor points rearward of the rear side of the vehicle, at least two anchor points laterally leftward of the left side of the vehicle, and at least two anchor points rightward of the right side of the vehicle. Each tie extends between one tie-down and a respective anchor point at a corresponding side of the vehicle, with the ties being arranged at selected angles relative to one another to securely retain the vehicle substantially against movement on the supporting surface but without deforming the deformation zone of the vehicle frame.

In a contemplated embodiment, each tie-down defines an eye portion for receiving a corresponding tie. One or more of the tie-downs may be articulable, e.g., the tie-downs at the front and rear sides of the frame, and one or more other tie-downs may be rigid with the frame, e.g., each tie-down at the left and right sides of the frame.

The frame may comprise at least two lengthwise extending frame rails, with front and rear bumper portions being affixed to the frame rails. At least two, and preferably three tie-downs, are affixed to each of the front and rear bumper portions. In addition, at least one tie-down may also be affixed to each frame rail adjacent the front side of the vehicle at a spacing from the front bumper portion and also adjacent the rear side of the vehicle at a spacing from the rear bumper portion. It is additionally preferred that at least two tie-downs are affixed to a left one of the frame rails adjacent the left side of the vehicle and at least two tie-downs are affixed to a right one of the frame rails adjacent the right side of the vehicle.

Each tie may advantageously include a tensioning device. Each tie may be in the form of a chain, cable, belt or other strap sufficient to withstand the tie-down forces to be exerted through the ties. The ties may be arranged in any suitable relationship to one another adapted to apply a desired level of tie-down forces without imposing deformation on the vehicle frame. For example, the ties at one or more selected sides of the vehicle may be arranged in crossing relation to one another or may be arranged in diverging relation to one another.

The supporting surface may be of various forms, for example but without limitation, a floor surface in a transport vehicle, including transport aircraft, a floor surface in a transport container, a mounting surface of a pallet, or a mounting surface of an airdrop platform.

The vehicle in itself comprises another aspect of the invention, in that the provision of multiple tie-downs affixed to the frame at selected laterally spaced-apart locations at the front, rear and sides of the vehicle adapts the vehicle for securement during transport via a plurality of elongate ties to a plurality of anchor points on a supporting surface to securely retain the vehicle substantially against movement on the supporting surface but without deforming the deformation zone of the frame.

DETAILED DESCRIPTION OF THE PREFERRED EMBODIMENTS

Referring now to the accompanying drawings, a system for securing a vehicle during transport from one location to another in accordance with the present invention basically comprises a vehicle, indicated overall at 10 in FIGS. 1-4, equipped with a plurality of tie-downs, e.g., tie-downs 11-26 according to one possible embodiment of the present securement system, in combination with an arrangement of multiple ties, e.g., ties 111-136, extending between the tie-downs and a plurality of anchor points, e.g., anchor points 211-236, on a supporting surface 200 of a transport structure, as depicted in FIGS. 5A, 5B, 6A and 6B, all as more fully described hereinafter.

With reference initially to FIGS. 1-4, the vehicle 10 is depicted as a utility vehicle of a type commercially-produced in compliance with applicable laws for operation on public roads and highways, as for example manufactured in differing forms by several existing automobile manufacturers, but which is suitable for adaptation to military uses. However, it is to be understood that the depiction of the vehicle 10 in such form is solely for representative and illustrative purposes, and the present invention is not intended nor to be construed as limited to such vehicles. On the contrary, it is expressly contemplated that the securement system of the present invention may be adapted for use in many and various other forms of vehicles.

In pertinent part, the vehicle 10 has a main structural frame 30 comprising two (and possible more) main frame rails 32, 33 extending in spaced-apart mirror-image relationship lengthwise for substantially the full length of the vehicle 10 and connected in known manner integrally and rigidly with each other via a plurality of connecting frame members (not shown) extending transversely between the frame rails 32, 33. The frame 30 further includes front and rear bumper portions 34, 36, respectively, in the form of structural members extending laterally between and secured rigidly to the respective front and rear ends of the frame rails 32, 33, e.g., by bolting and/or welding.

According to well-known current safety practices for the manufacture of automotive vehicles operated on public roads, each of the frame rails 32, 33 has one or more areas or zones designed to deform or otherwise yield in response to forces exerted on the frame 30 in excess of a predetermined threshold amount as would occur in the event of a crash with another vehicle or other type of accident, thereby to absorb at least a portion of such forces to prevent or mitigate the application of such forces to the operator/passenger compartment of the vehicle. Such areas or zones are commonly referred to as "crumple zones." Such crumple zones may be formed by different manufacturing techniques, sometimes considered proprietary to manufacturers, and are not necessarily apparent from a visual inspection of a vehicle frame. Accordingly, the depiction of the frame rails 32, 33 in the accompanying drawings does not include a specific illustration of the crumple zones, but rather the zones are only representatively indicated at 38 (see FIGS. 5A and 6A).

Each of the tie-downs 11-26 is affixed to the frame 30 of the vehicle 10 at selected locations spaced-apart from one another about each of the front, rear (back), left and right sides 10F, 10B, 10L, 10R, respectively, of the vehicle 10. More specifically, a total of five tie-downs, specifically tie-downs 11-15, are provided at the front side 10F of the vehicle. The three tie-downs 11, 12, 13 are affixed to the front bumper portion 34 of the frame 30, with the tie-down 12 located approximately midway along the bumper portion 34 substantially centrally between the frame rails 32, 33 coincident with the longitudinal centerline of the vehicle frame and with the tie-downs 11 and 13 spaced substantially equally to the left and right of the tie-down 12 substantially at the joinder of the frame rails 32, 33 to the bumper portion 34. Also at the front side 10F of the vehicle, the tie-down 14 is affixed to the underside of the left frame rail 32 and the tie-down 15 is affixed to the underside of the right frame rail 33 at a short spacing rearwardly from the front bumper portion 34.

Figure 1:
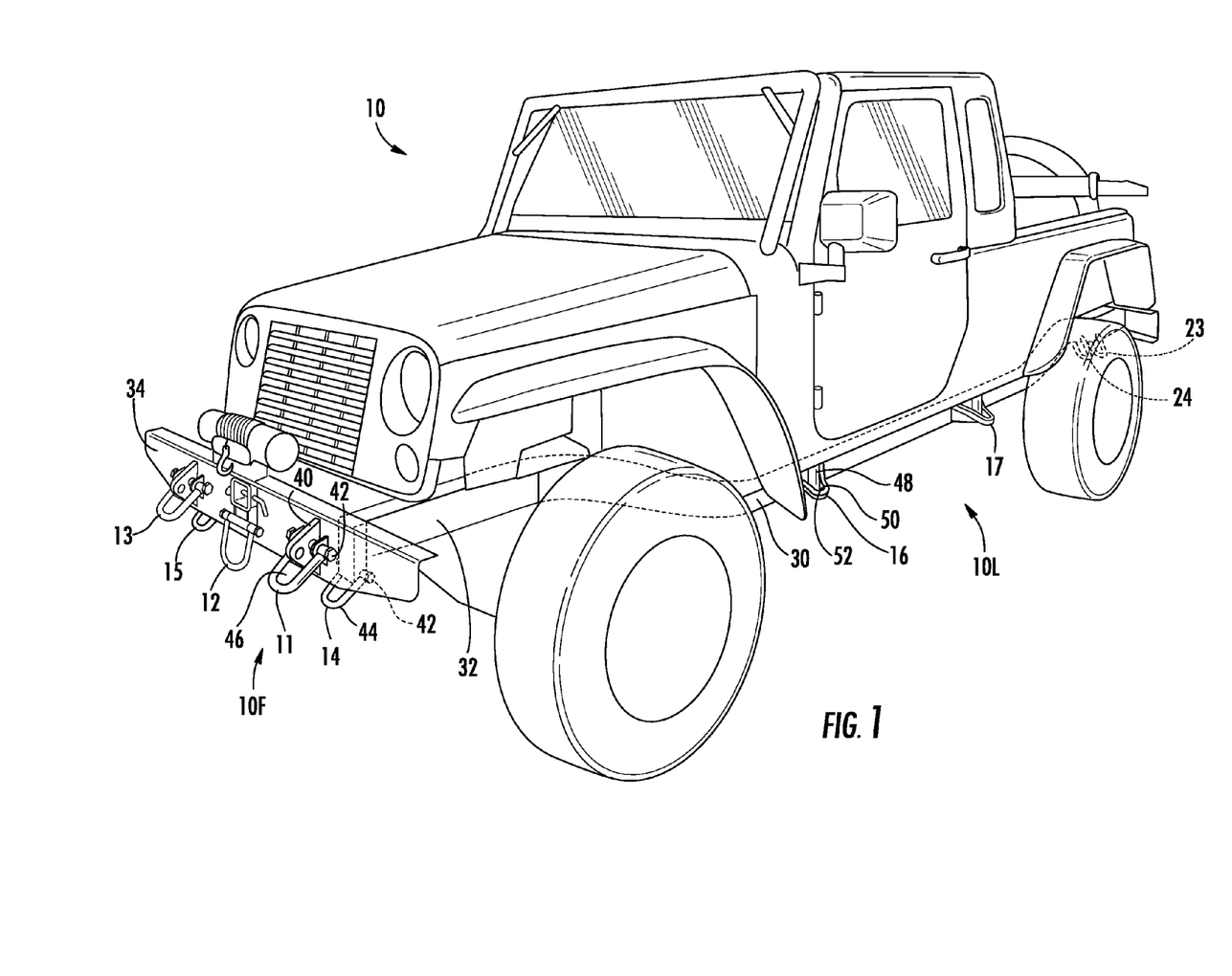
FIG. 1 is a front perspective view of a vehicle embodying tie-downs in accordance with the system of the present invention.
Figure 2:
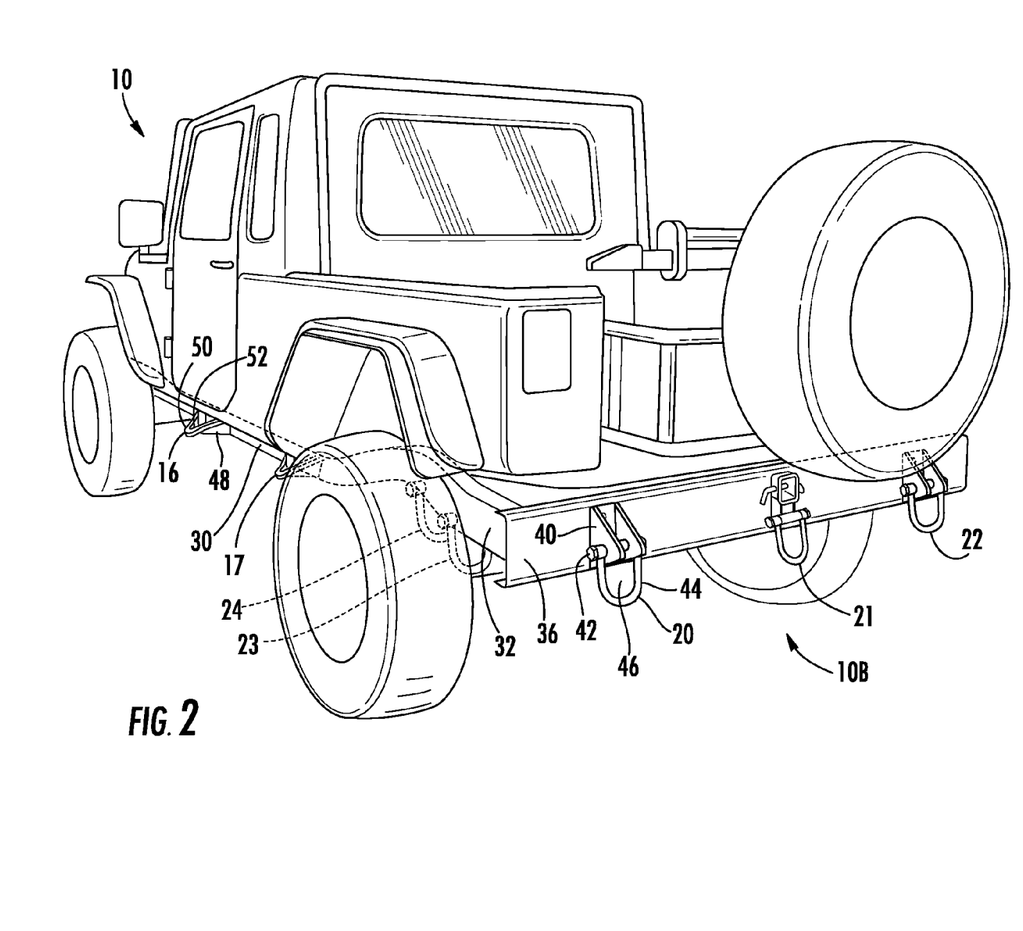
FIG. 2 is a rear perspective view of the vehicle of FIG. 1.
Figure 3:
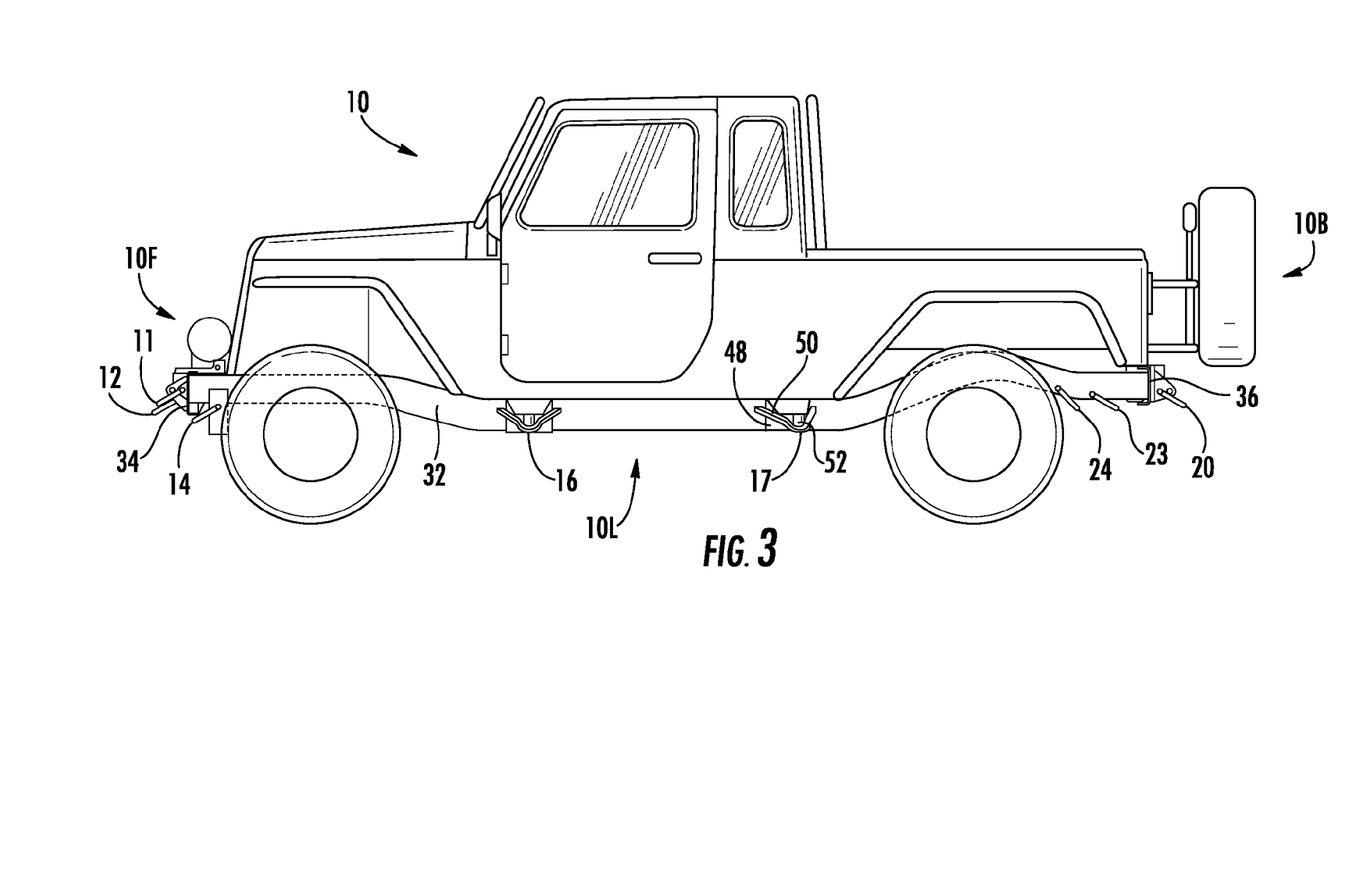
FIG. 3 is a left side elevational view of the vehicle of FIGS. 1 and 2.
Figure 4:
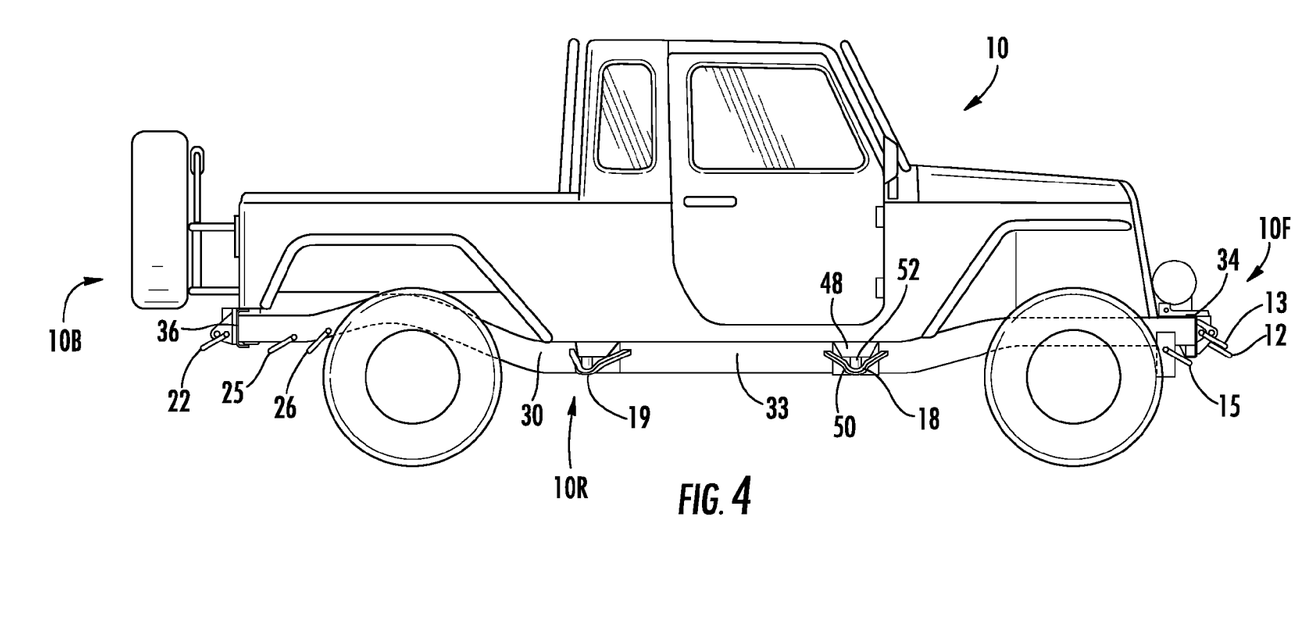
FIG. 4 is a right side elevational view of the vehicle of FIGS. 1 and 2.

Similarly, at the rear side 10B of the vehicle 10, seven tie-downs are provided, specifically tie-downs 20-26. The three tie-downs 20, 21, 22 are affixed to the rear bumper portion 36 of the frame 30, with the tie-down 21 located approximately midway along the bumper portion 36 substantially centrally between the frame rails 32, 33 and with the tie-downs 20 and 22 spaced substantially equally to the left and right of the tie-down 21 substantially at the joinder of the frame rails 32, 33 to the bumper portion 36. Also at the rear side 10B of the vehicle, the two tie-downs 23, 24 are affixed to the underside of the left frame rail 32, with the tie-down 23 at a short spacing forwardly from the rear bumper portion 36 and the tie-down 24 at a short spacing forwardly from the tie-down 23, and the two tie-downs 25, 26 are correspondingly affixed to the underside of the right frame rail 33, with the tie-down 25 at a short spacing forwardly from the rear bumper portion 36 and the tie-down 26 at a short spacing forwardly from the tie-down 25.

Each of the front and rear tie-downs 11-15, and 20-26 are affixed to the frame 30 to articulate, specifically in the embodiment as illustrated for upward and downward pivoting about horizontal axes. Each of the tie-downs 11-13, and 20-22, affixed to the front and rear bumper portions 34, 36 include a base 40 rigidly secured to the outer face of the respective bumper portion, a bolt 42 supported horizontally by the base 40, and a loop 44 rotatably supported on and projecting outwardly from the bolt 42 for upward and downward pivoting movement. Each tie-down 11-13 and 20-22 thereby defines an enclosed opening 46 in the form of an eye between the loop 44 and the bolt 42 through which a suitable tie 111 et seq. may be secured, as more fully described hereinafter. Each of the tie-downs 14, 15, and 23-26 include a loop 44 supported on a bolt 42 projecting through the respective frame rail 32, 33.

Two tie-downs are provided at each of the left and right sides 10L, 10R of the vehicle 10. Tie-downs 16, 17 are affixed at a spacing from one another to the left frame rail 32 intermediately therealong at the left side 10L of the vehicle so as to project laterally leftward from the frame rail 32 between the front and rear wheels of the vehicle, with the tie-down 16 located at a short spacing rearwardly from the forward wheels of the vehicle and with the tie-down 17 located at a short spacing forwardly of the rear wheels of the vehicle. Tie-downs 18, 19 are correspondingly affixed in spaced relation to the right frame rail 33 intermediately therealong in mirror-image relation to the tie-downs 16, 17, so as to project laterally rightward from the frame rail 33 between the front and rear wheels of the vehicle, with the tie-down 18 located at a short spacing rearwardly from the forward wheels of the vehicle and with the tie-down 19 located at a short spacing forwardly of the rear wheels of the vehicle. Each of the tie-downs 16, 17, 18, 19 are rigid and not pivotable or otherwise articulable. For such purpose, each tie-down 16, 17, 18, 19 has a solid triangular base 48 rigidly affixed, e.g., by welding, to the respective frame rail 32, 33 and a loop 50 rigidly welded or otherwise affixed to the base 48 and to the frame rail 32, 33 at a slightly downward angle relative thereto, whereby the loop 50 and the base 48 define an enclosed eye opening 52 which may receive a tie.

It is however contemplated, and is to be understood, that in other possible embodiments of the securement system of the present invention in the same or different vehicles, tie-downs may be provided in selectively differing numbers and locations about the frame of a vehicle, may be of other selected configurations or structures than the tie-downs 11-26, and may be articulable or non-articulable, including an ability for articulation in a different manner or direction of movement, so long as the arrangement and relative locations of the tie-downs is selected in relation to one another and to crumple or deformation zones or areas in the vehicle frame and an arrangement of ties is selected for connection to the tie-downs so that the system is enabled to securely retain the vehicle substantially against movement on a floor or other supporting transport surface but without deforming, weakening or otherwise damaging any crumple or deformation zone of the frame.

Figure 5A:
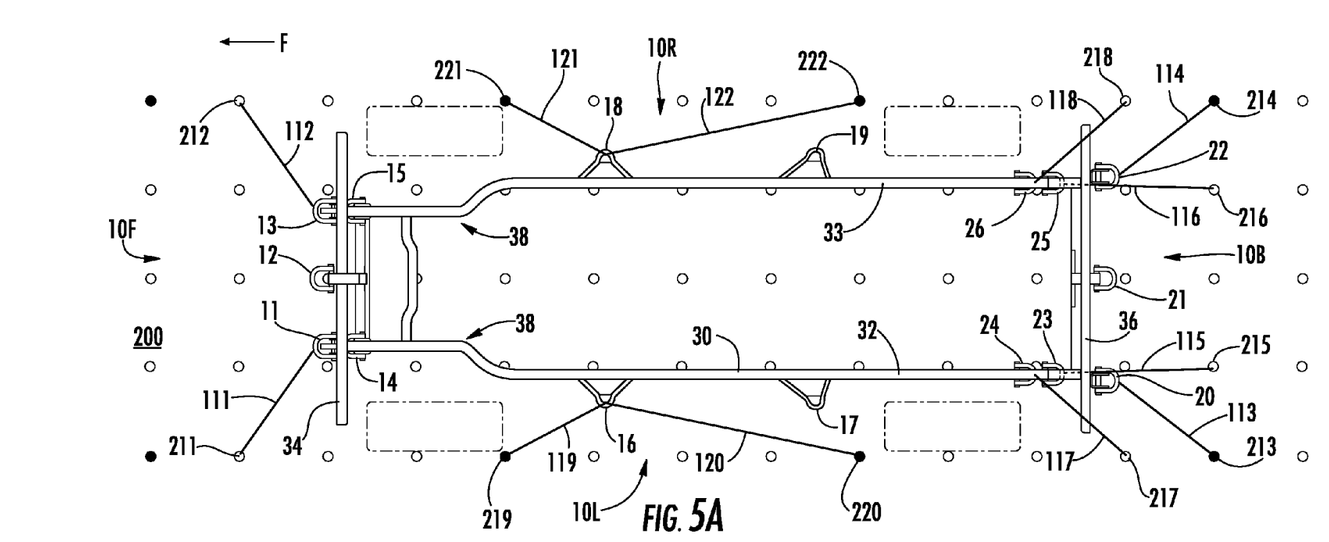
FIGS. 5A and 5B are schematic top plan and side views, respectively, of the vehicle of FIGS. 1-4 as secured to a cargo floor within a transport aircraft via one contemplated arrangement of ties in accordance with the system of the present invention.
Figure 5B:
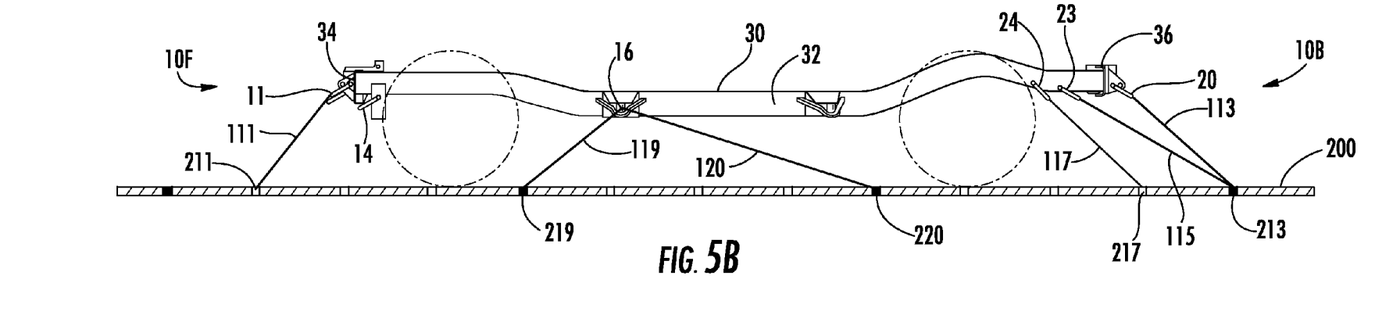
Figure 6A:
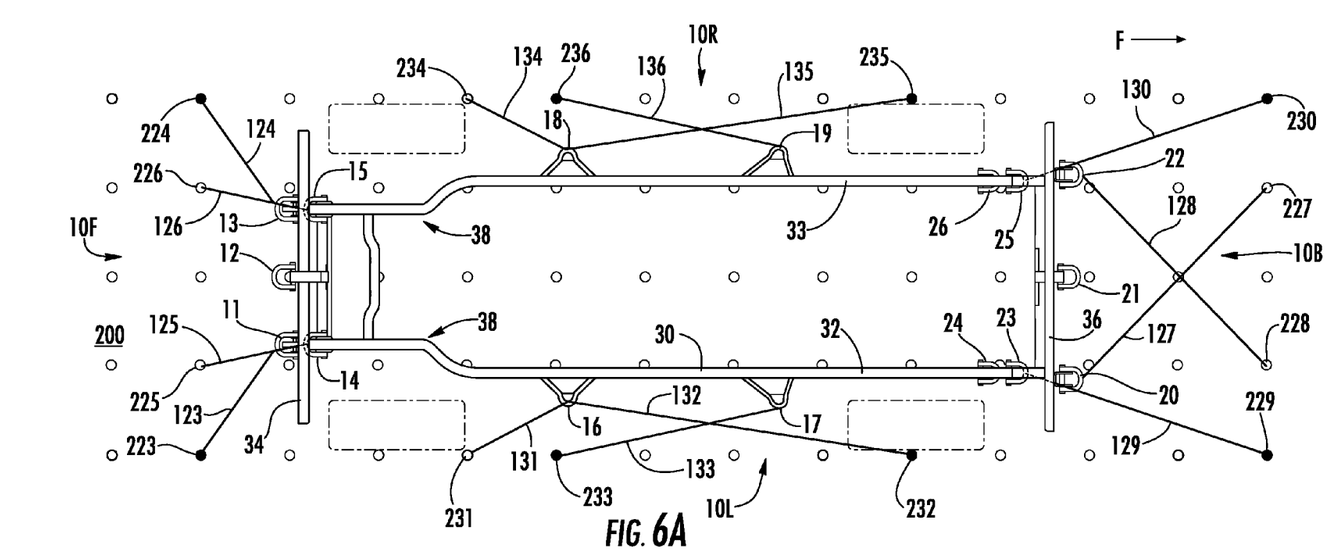
FIGS. 6A and 6B are schematic top plan and side views, respectively, of the vehicle of FIGS. 1-4 as secured to a cargo floor within a transport aircraft via another contemplated arrangement of ties in accordance with the system of the present invention.
Figure 6B:
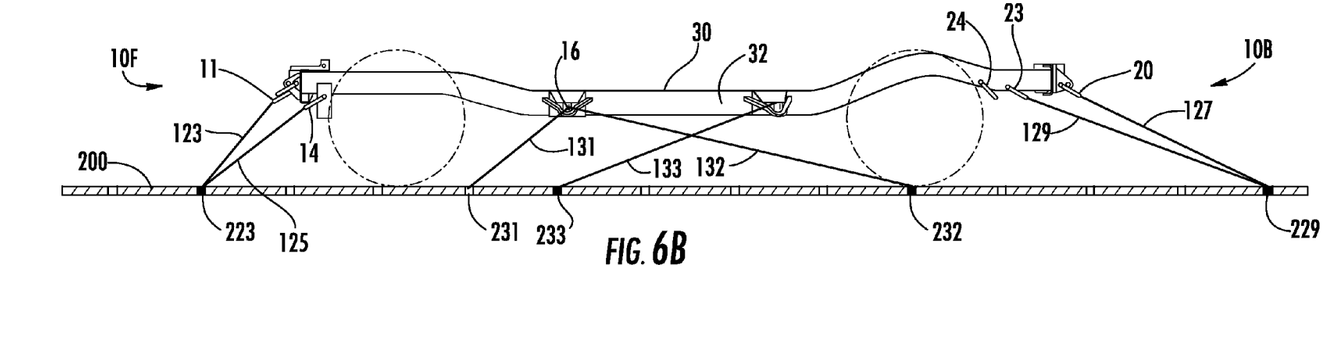

With reference now to FIGS. 5A, 5B, 6A and 6B, the vehicle 10 is shown as being secured to a supporting surface 200 in two different arrangements of ties, but it is to be understood that the securement arrangements are only exemplary and representative and the present invention is not limited to such arrangements. As previously indicated, the vehicle 10 is representatively depicted as being suitable for modification or adaptation for military uses. In military uses of the vehicle 10, it will be desirable if not essential that the vehicle be transportable from one location to another via any of various military transports, e.g., military helicopters or other aircraft. In turn, depending on circumstances, it may be necessary or desirable to load the vehicle into the aircraft sometimes with the front side 10F of the vehicle facing forwardly within the aircraft and sometimes with the rear side 10B of the vehicle facing forwardly within the aircraft. In each of FIGS. 5A, 5B, 6A and 6B, the directional arrow F signifies the direction of the front (cockpit) of the aircraft. FIGS. 5A and 5B representatively illustrate a securement system in accordance with the present invention when the vehicle 10 is loaded forwardly into the aircraft, and FIGS. 6A and 6B representatively illustrate a securement system in accordance with the present invention when the vehicle 10 is loaded rearwardly into the aircraft.

During transport, the vehicle 10 may be supported directly on a floor of the aircraft or other transport, or within a fully or partially enclosed container having its own supporting floor surface, or on a mounting surface of a separate support structure, such as an airdrop platform or another form of supporting pallet. Regardless of the type or form of supporting surface 200 on which the vehicle 10 is to be transported, the surface 200 is equipped with a plurality of anchor points, e.g. the anchor points 211-236, to which tie-downs of the vehicle 10 are selectively secured via ties. Thus, in FIGS. 5A, 5B, 6A and 6B, the supporting surface 200 and anchor points 211-236 thereof are intended to be representative of any and all suitable forms of supporting surfaces, whether a fixed floor in an aircraft, a floor surface of a container, or a mounting surface of an airdrop platform or a pallet. Preferably, the anchor points of the supporting surface 200 may be equidistantly spaced in a grid-like array over the full longitudinal and lateral extent of the surface. In FIGS. 5A, 5B, 6A and 6B, the anchor points are depicted only schematically as points, as the anchor points may be of various known constructions and configurations, so long as each anchor point is adapted for attachment of a suitable tie, e.g., a chain, cable, belt, strap, or the like, with or without connectors such as hooks on an end or ends of the tie. For example, a suitable known form of anchor point may comprise a bracket affixed to the supporting surface 200 and holding a closed link or loop moveably with respect to the bracket to allow the link or loop to extend forwardly, rearwardly or laterally from the bracket to allow a tie to extend through the link or loop or a hook or connector on a tie to engage with the link or loop.

For sake of clarity and consistency, the designation of all anchor points in the following description of FIGS. 5A, 5B, 6A and 6B as "forwardly," "rearwardly," or "laterally" is with respect to the front, rear, left and right sides 10F, 10B, 10L, 10R of the vehicle, regardless of whether the vehicle 10 is described as loaded forwardly into the aircraft, i.e., with the front vehicle side 10F facing the front of the aircraft and the rear vehicle side 10B facing the rear of the aircraft as in FIGS. 5A and 5B, or as loaded rearwardly into the aircraft, i.e., with the front vehicle side 10F facing the rear of the aircraft and the rear vehicle side 10B facing the front of the aircraft as in FIGS. 6A and 6B.

With the vehicle 10 loaded in a forwardly facing disposition within the aircraft as depicted in FIGS. 5A and 5B, the front side 10F of the vehicle 10 is secured by two ties 111, 112. The tie 111 is connected between the left front bumper tie-down 11 and an anchor point 211 located forwardly and laterally outwardly from the tie-down 11 and the tie 112 is similarly connected in mirror-image relation between the right front bumper tie-down 13 and an anchor point 212 located forwardly and laterally outwardly from the tie-down 13. The rear side 10B of the vehicle 10 is secured by six ties 113-118. The tie 113 is connected between the rear bumper tie-down 20 and an anchor point 213 located rearwardly and laterally outwardly from the tie-down 20 and the tie 114 is similarly connected in mirror-image relation between the rear bumper tie-down 22 and an anchor point 214 located rearwardly and laterally outwardly from the tie-down 22. The tie 115 is connected between the left rear frame rail tie-down 23 and an anchor point 215 substantially directly rearwardly thereof and directly laterally inwardly from the anchor point 213, and the tie 116 is similarly connected in mirror-image relation between the right rear frame rail tie-down 25 and an anchor point 216 substantially directly rearwardly thereof and directly laterally inwardly from the anchor point 214. The tie 117 is connected between the left rear frame rail tie-down 24 and an anchor point 217 located rearwardly and laterally outwardly thereof and directly forwardly of the anchor point 213, and the tie 118 is connected in mirror-image relation between the right rear frame rail tie-down 26 and an anchor point 218 located rearwardly and laterally outwardly thereof and directly forwardly of the anchor point 214.

The left side 10L of the vehicle 10 is secured by two ties 119, 120, and the right side 10R of the vehicle 10 is secured by two ties 121, 122. The tie 119 is connected between the forward left side frame rail tie-down 16 and an anchor point 219 forwardly and laterally outwardly thereof, and the tie 120 is connected between the same forward left side frame rail tie-down 16 and an anchor point 220 rearwardly and laterally outwardly thereof, whereby the ties 119, 120 extend in diverging forward and rearward directions. The ties 121, 122 are similarly arranged in diverging directions in mirror-image relation to the ties 119, 120. The tie 121 is connected between the forward right side frame rail tie-down 18 and an anchor point 221 forwardly and laterally outwardly thereof, and the tie 122 is connected between the same forward right side frame rail tie-down 18 and an anchor point 222 rearwardly and laterally outwardly thereof.

Each tie 111-122 is drawn securely taut in its described arrangement, e.g., via any suitable know tensioning device. The described arrangement of the ties 111-122 is selected such that the ties serve to prevent forward-rearward, lateral (leftward-rightward) and upward-downward movements of the vehicle 10 under the forces generated while the transport aircraft is in all phases of flight, including take-off, landing, acceleration, deceleration, altitudinal increases and decreases, and banking and turning movements, while at the same time the arrangement of ties collectively oppose one another so as to impose an essentially neutral stress and loading of the frame, and in particular the crumple zones thereof. It is expected that the securement arrangement as described will satisfy the criteria of U.S. Department of Defense Specification MIL-STD-209, to withstand substantial multiple forward, rearward and lateral "G-forces" occurring during flight.

A different arrangement of ties and anchor points is contemplated to secure the vehicle 10 when loaded in a rearwardly facing disposition within the aircraft, as depicted in FIGS. 6A and 6B. In such a loading disposition, the rearwardly-facing front side 10F of the vehicle 10 is secured by four ties 123, 124, 125, 126. The tie 123 is connected between the left front bumper tie-down 11 and an anchor point 223 located forwardly and laterally outwardly from the tie-down 11 and the tie 124 is similarly connected in mirror-image relation between the right front bumper tie-down 13 and an anchor point 224 located forwardly and laterally outwardly from the tie-down 13. The tie 125 is connected between the front left frame rail tie-down 14 and an anchor point 225 predominantly forwardly thereof and laterally inwardly adjacent the anchor point 223, and the tie 126 is similarly connected in mirror-image relation between the front right frame rail tie-down 15 and an anchor point 226 predominantly forwardly thereof and laterally inwardly adjacent the anchor point 224.

The forwardly-facing rear side 10B of the vehicle 10 is secured by four ties 127, 128, 129, 130. The tie 127 is connected between the left rear bumper tie-down 20 and an anchor point 227 located rearwardly and laterally inwardly (rightwardly with respect to the vehicle) from the tie-down 20 substantially directly rearwardly of the right rear bumper tie-down 22, and the tie 128 is similarly connected in mirror-image relation between the right rear bumper tie-down 22 and an anchor point 228 located rearwardly and laterally inwardly (leftwardly with respect to the vehicle) from the tie-down 22 substantially directly rearwardly of the left rear bumper tie-down 20, whereby the ties 127, 128 extend in crossing relation to each other. The tie 129 is connected between the left rear frame rail tie-down 23 and an anchor point 229 located rearwardly and laterally outwardly thereof and directly laterally outwardly from the anchor point 228, and the tie 130 is similarly connected in mirror-image relation between the right rear frame rail tie-down 25 and an anchor point 230 located rearwardly and laterally outwardly thereof and directly laterally outwardly from the anchor point 227.

The left side 10L of the vehicle 10 is secured by three ties 131, 132, 133, and the right side 10R of the vehicle 10 is correspondingly secured by three ties 134, 135, 136. The tie 131 is connected between the forward left side frame rail tie-down 16 and an anchor point 231 forwardly and laterally outwardly thereof, and the tie 132 is connected between the same forward left side frame rail tie-down 16 and an anchor point 232 rearwardly and laterally outwardly thereof, whereby the ties 131, 132 extend in diverging forward and rearward directions. The tie 133 is connected between the rearward left side frame rail tie-down 17 and an anchor point 233 forwardly and laterally outwardly thereof substantially directly laterally adjacent the tie-down 16 and directly rearwardly of the anchor point 231, whereby the ties 132, 133 extend in crossing relation to one another. The ties 134, 135, 136 are similarly arranged in mirror-image relation to the ties 131, 132, 133. The tie 134 is connected between the forward right side frame rail tie-down 18 and an anchor point 234 forwardly and laterally outwardly thereof, and the tie 135 is connected between the same forward right side frame rail tie-down 18 and an anchor point 235 rearwardly and laterally outwardly thereof. The tie 136 is connected between the rearward right side frame rail tie-down 19 and an anchor point 236 forwardly and laterally outwardly thereof substantially directly laterally adjacent the tie-down 18 and directly rearwardly of the anchor point 234, whereby the ties 135, 136 extend in crossing relation to one another.

As in the arrangement of FIGS. 5A, 5B, each tie 123-136 in the arrangement of FIGS. 6A, 6B is drawn securely taut such that the described arrangement of the ties 123-136 serve to prevent movements of the vehicle 10 in any direction under the forces generated while the transport aircraft is in flight, while at the same time opposing one another so as to negate stressing and loading of the frame, particularly the crumple zones thereof. This alternative securement arrangement is likewise expected to satisfy the criteria of Specification MIL-STD-209.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

What is claimed is:

1. A system for securing a vehicle during transport against movement under forces from multiple directions, comprising in combination:
a vehicle having:
a frame with at least one deformation zone adapted to yield to absorb impact forces in the event of a crash of the vehicle,
a plurality of tie-downs affixed to the frame at selected laterally spaced-apart locations about the frame, including at least two tie-downs at each of a front side and a rear side of the frame and at least one tie-down at each of a left side and a right side of the frame,
a surface for supporting the vehicle during transport, and having:
a plurality of anchor points at selected laterally spaced-apart locations about the supporting surface outwardly from each side of the vehicle, including at least two anchor points forward of the front side of the vehicle, at least two anchor points rearward of the rear side of the vehicle, at least two anchor points laterally leftward of the left side of the vehicle, and at least two anchor points rightward of the right side of the vehicle, and
a plurality of elongate ties extending tautly between each tie-down and a respective anchor point at a corresponding side of the vehicle, the ties being arranged at selected angles relative to one another to securely retain the vehicle substantially against movement on the supporting surface but without deforming the deformation zone of the frame.

2. A system for securing a vehicle during transport according to claim 1, wherein each tie-down defines an eye portion for receiving a corresponding tie.

3. A system for securing a vehicle during transport according to claim 1, wherein at least one of the tie-downs is articulable.

4. A system for securing a vehicle during transport according to claim wherein each tie-down at the front and rear sides of the frame is articulable.

5. A system for securing a vehicle during transport according to claim 1, wherein at least one of the tie-downs is rigid with the frame.

6. A system for securing a vehicle during transport according to claim 5, wherein each tie-down at the left and right sides of the frame is rigid with the frame.

7. A system for securing a vehicle during transport according to claim 1, wherein the frame includes a front bumper portion, with at least two tie-downs affixed to the front bumper portion.

8. A system for securing a vehicle during transport according to claim 7, wherein three tie-downs are affixed to the front bumper portion.

9. A system for securing a vehicle during transport according to claim 8, wherein the frame includes at least two lengthwise extending frame rails, the front bumper portion being affixed to the frame rails, and at least one tie-down being affixed to each frame rail adjacent the front side of the vehicle at a spacing from the front bumper portion.

10. A system for securing a vehicle during transport according to claim 1, wherein the frame includes a rear bumper portion, with at least two tie-downs affixed to the rear bumper portion.

11. A system for securing a vehicle during transport according to claim 10, wherein three tie-downs are affixed to the rear bumper portion.

12. A system for securing a vehicle during transport according to claim 11, wherein the frame includes at least two lengthwise extending frame rails, the rear bumper portion being affixed to the frame rails, and at least one tie-down being affixed to each frame rail adjacent the rear side of the vehicle at a spacing from the rear bumper portion.

13. A system for securing a vehicle during transport according to claim 1, wherein the frame includes at least two lengthwise extending frame rails, with at least one tie-down affixed to each frame rail adjacent the front side of the vehicle and at least one tie-down affixed to each frame rail adjacent the rear side of the vehicle.

14. A system for securing a vehicle during transport according to claim 1, wherein the frame includes at least two lengthwise extending frame rails, with at least two tie-downs being affixed to a left one of the frame rails adjacent the left side of the vehicle and at least two tie-downs being affixed to a right one of the frame rails adjacent the right side of the vehicle.

15. A system for securing a vehicle during transport according to claim 1, wherein each tie includes a tensioning device.

16. A system for securing a vehicle during transport according to claim wherein each tie includes a chain.

17. A system for securing a vehicle during transport according to claim 1, wherein the ties at at least one selected side of the vehicle are arranged in crossing relation to one another.

18. A system for securing a vehicle during transport according to claim 1, wherein the ties at at least one selected side of the vehicle are arranged in diverging relation to one another.

19. A system for securing a vehicle during transport according to claim 1, wherein the supporting surface is a floor surface.

20. A system for securing a vehicle during transport according to claim wherein the supporting surface is a floor surface in an aircraft.

21. A system for securing a vehicle during transport according to claim 1, wherein the supporting surface is a floor surface in a container.

22. A system for securing a vehicle during transport according to claim wherein the supporting surface is a mounting surface of a pallet.

23. A system for securing a vehicle during transport according to claim wherein the supporting surface is a mounting surface of an airdrop platform.

* * * * *